United States Patent
Lee

(10) Patent No.: US 11,411,240 B2
(45) Date of Patent: Aug. 9, 2022

(54) FCEV MAX POWER CONTROL MAP AT HIGH TEMPERATURE THROUGH PREDICTIVE CONVECTION

(71) Applicants: Hyundai Motor Company, Seoul (KR); Kia Motors Corporation, Seoul (KR)

(72) Inventor: Kevin Lee, Los Angeles, CA (US)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 143 days.

(21) Appl. No.: 16/837,642

(22) Filed: Apr. 1, 2020

(65) Prior Publication Data
US 2021/0313605 A1   Oct. 7, 2021

(51) Int. Cl.
*H01M 8/04858* (2016.01)
*H01M 8/0432* (2016.01)
*B60L 50/72* (2019.01)
*B60L 58/33* (2019.01)
*H01M 8/04992* (2016.01)

(52) U.S. Cl.
CPC ......... *H01M 8/04932* (2013.01); *B60L 50/72* (2019.02); *B60L 58/33* (2019.02); *H01M 8/0432* (2013.01); *H01M 8/04358* (2013.01); *H01M 8/04902* (2013.01); *H01M 8/04992* (2013.01); *H01M 2250/20* (2013.01)

(58) Field of Classification Search
CPC .... B60L 50/72; B60L 58/33; H01M 2250/20; H01M 8/0432; H01M 8/04358; H01M 8/04902; H01M 8/04932; H01M 8/04992; Y02E 60/50; Y02T 90/40
See application file for complete search history.

(56) References Cited

U.S. PATENT DOCUMENTS

2017/0179512 A1   6/2017 Eschenbach et al.

FOREIGN PATENT DOCUMENTS

JP   2007053051 A  * 3/2007   .............. B60L 58/40

OTHER PUBLICATIONS

Machine Translation JP2007053051(A) (Year: 2007).*

* cited by examiner

*Primary Examiner* — Victoria H Lynch
(74) *Attorney, Agent, or Firm* — Fox Rothschild LLP

(57) ABSTRACT

A fuel cell electric vehicle (FCEV) power control system reduces a power limitation in conditions such as uphill driving and/or high temperature environments. The FCEV power control system utilizes dynamic cooling detection logic and/or predictive convection. The FCEV power control system may be operated in accordance with a method of controlling power of a fuel cell including receiving a plurality of inputs including a heat output of the fuel cell, an ambient temperature, a temperature of a coolant of the fuel cell, and a time of operation of the fuel cell. The method may include calculating an accumulation of cooling from convection, an accumulation of heat generated from the fuel cell, and a cooling ratio. The method may include adjusting a maximum allowable current of the fuel cell based on the cooling ratio. Related apparatuses, systems, techniques and articles are also described.

9 Claims, 7 Drawing Sheets

FCEV MAX POWER CONTROL MAP AT HIGH TEMPERATURE THROUGH PREDICTIVE CONVECTION

FIELD OF THE DISCLOSURE

The present disclosure relates generally to fuel cell electric vehicle (FCEV) power control, and more particularly, to an FCEV power control map.

BACKGROUND

In the related art, to prevent fuel cell stack dry-out, a conventional technology provides fuel cell vehicles with power control systems programmed to limit power relatively conservatively, particularly as the power control system reaches maximum coolant operation temperature.

Conventional fuel cell control systems include a predictive operation of the fuel cell and adjustment thereof based on an external parameter such as uphill driving. Specifically, when uphill driving is detected by a sensor (such as a grade angle sensor), the fuel cell temperature is predicted to be greater than a permissible temperature, and, in response, a controller reduces the current set point operating temperature of the fuel cell before the start of uphill driving to increase cooling capacity. While useful in increasing cooling capacity for uphill driving, the conventional fuel cell control system disadvantageously reduces maximum power output of the fuel cell.

SUMMARY

One or more of the following features may be included in any feasible combination.

The present disclosure provides a method of controlling power of a fuel cell. The method may include receiving a plurality of inputs including a heat output of the fuel cell, an ambient temperature, a temperature of a coolant of the fuel cell, and a time of operation of the fuel cell, calculating an accumulation of cooling from convection based on the plurality of inputs, and calculating an accumulation of heat generated from the fuel cell based on the accumulation of cooling from convection and the plurality of inputs. Additionally, the method may include calculating a cooling ratio based on the accumulation of cooling from convection and the accumulation of heat generated from the fuel cell and adjusting a maximum allowable current of the fuel cell based on the cooling ratio.

The maximum allowable current of the fuel cell may be determined by calculating a difference between an absolute allowed fuel cell current limit and a product of the absolute allowed fuel cell current limit and the cooling ratio. Additionally, the maximum allowable current of the fuel cell may be determined by comparing the difference with a predetermined threshold. Further, the maximum allowable current of the fuel cell may be determined by determining that the difference is greater than the predetermined threshold; and setting the maximum allowable current of the fuel cell based on a power limit calibration table value. Still further, the maximum allowable current of the fuel cell may be determined by determining that the difference is less than the predetermined threshold; and setting the maximum allowable current of the fuel cell based on the product of the absolute allowed fuel cell current limit and the cooling ratio.

The method may further include calculating a convection coefficient based on the heat output of the fuel cell, a radiator fan cooling capacity based on the time of operation of the fuel cell, and a difference between the temperature of the coolant of the fuel cell and the ambient temperature. Additionally, the method may further include calculating an integration of a product of the convection coefficient and the difference between the temperature of the coolant of the fuel cell and the ambient temperature over the time of operation of the fuel cell. Further, the method may further include calculating an integration of the heat output of the fuel cell over the time of operation of the fuel cell.

The method may include determining that the heat output of the fuel cell is greater than a first predetermined threshold; determining that the ambient temperature is greater than a second predetermined threshold; and determining that the temperature of the coolant of the fuel cell is greater than a third predetermined threshold. The first predetermined threshold may be about 0 kW. The second predetermined threshold may be about 10° C. The third predetermined threshold may be about 56° C.

The method may further include operating a vehicle based on the adjusting of the maximum allowable current of the fuel cell based on the cooling ratio. That is, the maximum allowable current of the fuel cell may be adjusted based on the fuel cell heat, ambient temperature, and fuel cell coolant temperature, which may be used to calculate heat generated, heat cooled, and a convection coefficient, which may be used to calculate a cooling ratio, and which may be compared to an absolute allowed fuel cell current.

Additionally, the present disclosure provides a system for controlling power of a fuel cell. The system may include a processor. The system may include a memory storing a program for execution by the processor. The program may include instructions, which when executed by the processor cause the processor to perform operations. The operations may include receiving, by the processor, a plurality of inputs including a heat output of the fuel cell, an ambient temperature, a temperature of a coolant of the fuel cell, and a time of operation of the fuel cell.

The operations may include calculating, by the processor, an accumulation of cooling from convection based on the plurality of inputs. The operations may include calculating, by the processor, an accumulation of heat generated from the fuel cell based on the accumulation of cooling from convection and the plurality of inputs. The operations may include calculating, by the processor, a cooling ratio based on the accumulation of cooling from convection and the accumulation of heat generated from the fuel cell. The operations may include adjusting, by the processor, a maximum allowable current of the fuel cell based on the cooling ratio.

The maximum allowable current of the fuel cell may be determined by calculating a difference between an absolute allowed fuel cell current limit and a product of the absolute allowed fuel cell current limit and the cooling ratio. The maximum allowable current of the fuel cell may be determined by comparing the difference with a predetermined threshold.

In response to determining that the difference is greater than the predetermined threshold, the operations may include setting the maximum allowable current of the fuel cell based on a power limit calibration table value. In response to determining that the difference is less than the predetermined threshold, the operations may include setting the maximum allowable current of the fuel cell based on the product of the absolute allowed fuel cell current limit and the cooling ratio.

Further, the present disclosure provides a vehicle including the fuel cell, and the system described herein.

Further, the present disclosure provides a non-transitory computer-readable storage medium storing a program for controlling power of a fuel cell. The program may be provided for execution by a processor and a memory storing the program. The program may include instructions, which when executed by the processor cause the processor to perform operations. The operations may include program instructions that receive, by the processor, a plurality of inputs including a heat output of the fuel cell, an ambient temperature, a temperature of a coolant of the fuel cell, and a time of operation of the fuel cell. The operations may include program instructions that calculate, by the processor, an accumulation of cooling from convection based on the plurality of inputs.

The operations may include program instructions that calculate, by the processor, an accumulation of heat generated from the fuel cell based on the accumulation of cooling from convection and the plurality of inputs. The operations may include program instructions that calculate, by the processor, a cooling ratio based on the accumulation of cooling from convection and the accumulation of heat generated from the fuel cell. The operations may include program instructions that adjust, by the processor, a maximum allowable current of the fuel cell based on the cooling ratio.

The maximum allowable current of the fuel cell may be determined by program instructions that calculate a difference between an absolute allowed fuel cell current limit and a product of the absolute allowed fuel cell current limit and the cooling ratio. The maximum allowable current of the fuel cell may be determined by program instructions that compare the difference with a predetermined threshold. In response to determining that the difference is greater than the predetermined threshold, the program instructions may include setting the maximum allowable current of the fuel cell based on a power limit calibration table value. In response to determining that the difference is less than the predetermined threshold, the program instructions may include setting the maximum allowable current of the fuel cell based on the product of the absolute allowed fuel cell current limit and the cooling ratio.

Notably, the present invention is not limited to the combination of the elements as listed above and may be assembled in any combination of the elements as described herein.

These and other capabilities of the disclosed subject matter will be more fully understood after a review of the following figures, detailed description, and claims.

BRIEF DESCRIPTION OF THE DRAWINGS

The embodiments herein may be better understood by referring to the following description in conjunction with the accompanying drawings in which like reference numerals indicate identically or functionally similar elements, of which.

Figure 1:
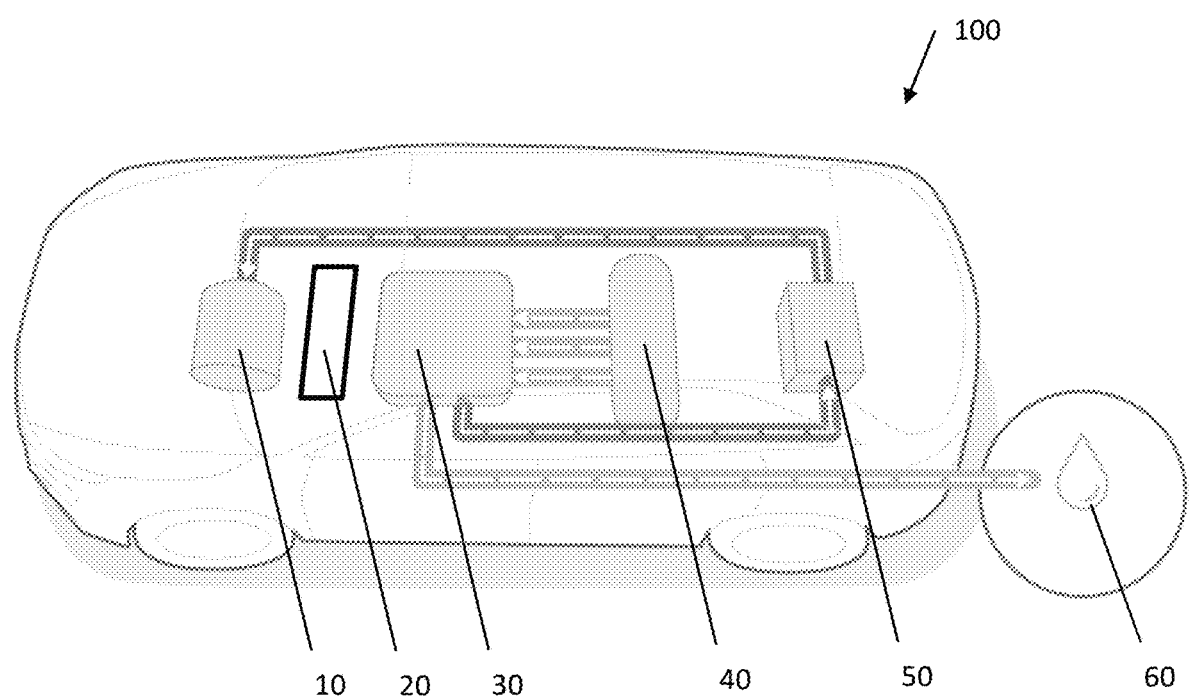
FIG. 1 is a diagram of a fuel cell electric vehicle according to an exemplary embodiment of the present disclosure.

It is noted that the drawings are not necessarily to scale. The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting exemplary embodiments and that the scope of the present invention is defined solely by the claims.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

Although at least one exemplary embodiment is described as using a plurality of units to perform the exemplary process, it is understood that the exemplary processes may also be performed by one or plurality of modules. Additionally, it is understood that the term controller/control unit may refer to a hardware device that includes a memory and a processor. The memory may be configured to store the modules and the processor may be specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third" and so on, herein, are provided to identify the operations, without describing the order of the operations, and the operations may be executed in a different order from the stated order unless a specific order is definitely specified in the context.

An FCEV power control system has been developed that reduces a power limitation in conditions such as uphill driving and/or high temperature environments. The reduction in the power limitation is performed relatively quickly. The FCEV power control system utilizes dynamic cooling detection logic and/or predictive convection.

FCEVs utilize power control systems to prevent faults and failures and lengthen the lifespan of the fuel cell battery. Some power control systems limit and control the power available for a motor when the FCEV is operated in an electric vehicle mode. The present disclosure provides a power control system that may include a motor controller configured to adjust driving speed and torque of a motor in accordance with a transmission, load, and battery state of charge. The power control system may include an apparatus for charging and discharging the battery by adjusting the output voltage of the fuel cell and the regenerative voltage generated during braking. The power control system also determines a voltage between the battery and a direct current (DC) converting unit. The power control system may be configured to monitor various vehicle controllers via a control area network (CAN) unit, and distribute power of the fuel cell and the battery, supplied to the motor.

FIG. 1 is a diagram of a fuel cell electric vehicle (FCEV) 100 according to an exemplary embodiment of the present disclosure. As shown in FIG. 1, the FCEV 100 may include a motor 10, a controller 20, a fuel-cell stack 30, a hydrogen supply 40, and a battery 50. The controller 20 may be configured to operate the other components including the motor 10, the fuel-cell stack 30, the hydrogen supply 40, and the battery 50. In operation, hydrogen from the hydrogen supply 40 travels to the fuel-cell stack 30. In the fuel-cell stack 30, an electrochemical reaction with oxygen collected from an air intake generates electricity, which powers to motor 10, and water 60. The controller 20 may be operated using an improved control map, detailed hereinbelow. Although the present disclosure highlights implementation of a control map in the context of FCEVs, the control map may be provided for hybrid electric vehicles, plug-in hybrid electric vehicles, internal combustion engine vehicles, and the like.

The FCEV maximum power control map of the present disclosure allows a vehicle controller to reduce a power limitation in demanding driving conditions, such as uphill driving and/or hot ambient temperatures. The FCEV maximum power control map is not limited to uphill or hot conditions and may also be implemented in any driving condition that elevates coolant temperature relative to ambient temperature or in conditions where ambient temperature increases with relatively steady coolant temperatures. In other words, the FCEV maximum power control map may be implemented without the need for a sensor that detects the grade or slope of a road on which the vehicle is being driven.

Additionally, the FCEV maximum power control map allows rapid adjustment through a controller configured with dynamic cooling detection logic. In some exemplary embodiments, the FCEV maximum power control map is accessed by a controller to calculate and compare accumulated convection cooling capacity versus accumulated heat and uses a ratio, e.g., a ratio of a cooling capacity relative to heat generated, to reduce a power limitation to maximize fuel cell power in the demanding driving conditions such as uphill driving. For a driver of the vehicle, the system delivers more power earlier in the demanding driving condition than with conventional systems, thus improving user experience.

The present disclosure includes hereinbelow an overview of an exemplary fuel cell system. Various charts, formulas, flow diagrams and logical diagrams are provided. To demonstrate the performance of the improved system, examples are provided. In these examples, improved performance is demonstrated in an extreme environment (i.e., relatively hot weather during uphill driving).

The FCEV of FIG. 1 may be configured with an FCEV maximum power control map according to exemplary embodiments of the present disclosure. The FCEV maximum power control map may employ convection cooling, i.e., cooling of an object by a difference in temperature between a surface of the object and a temperature of an ambient environment. For instance, during uphill driving, as altitude increases, ambient temperature decreases due to a reduction in atmospheric pressure; therefore, cooling by convection increases.

Cooling by convection may be expressed as Equation (1), as follows:

$$Q_{cooling} = C_{convection}(T_{coolant} - T_{ambient}) \qquad (1)$$

In Equation (1), $Q_{cooling}$ refers to cooling by convection or convection cooling capacity, $C_{convection}$ refers to a convection coefficient, $T_{coolant}$ refers to a temperature of coolant, and $T_{ambient}$ refers to an ambient temperature.

Figure 2:
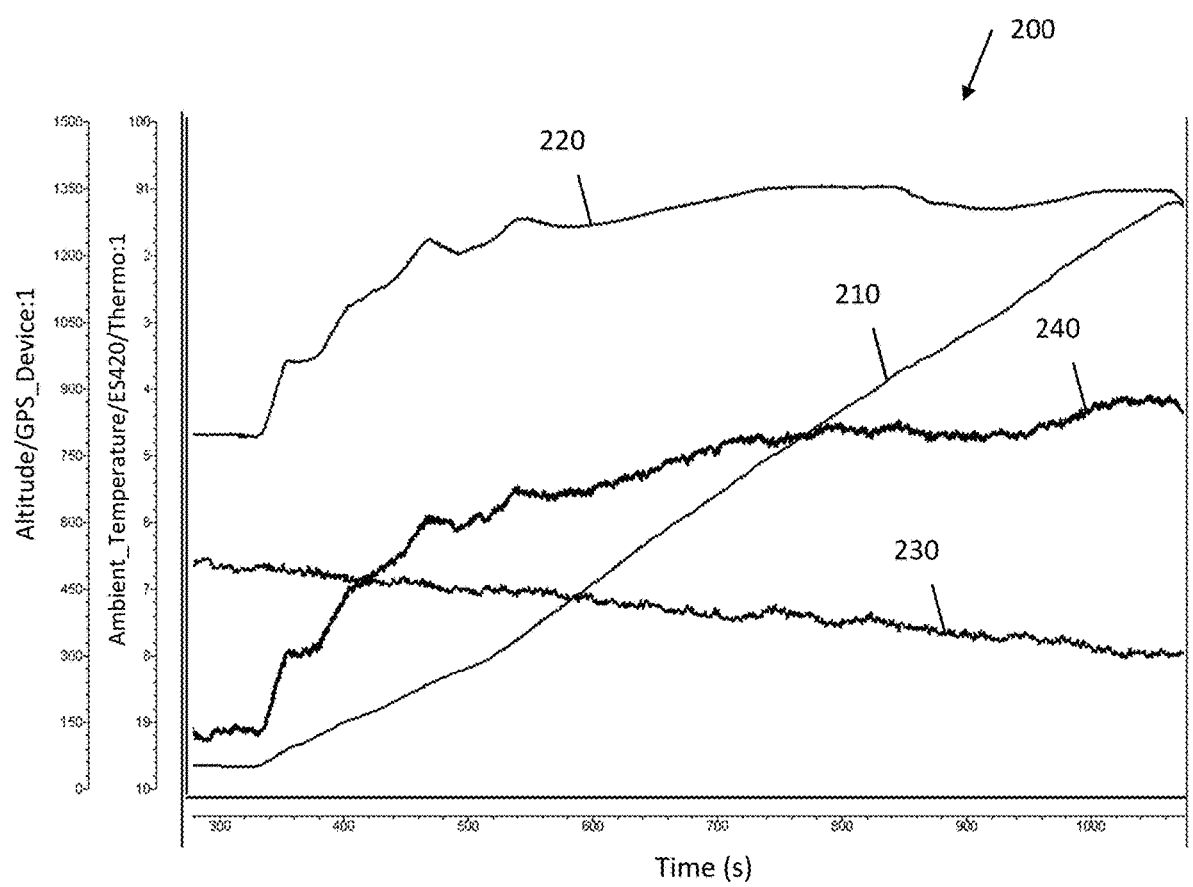
FIG. 2 is a chart showing changes in temperature as a vehicle ascends in relatively hot uphill driving conditions over time according to an exemplary embodiment of the present disclosure.

An example of cooling by convection is demonstrated by FIG. 2 illustrating a chart of changes in temperature as a vehicle ascends in high temperature uphill driving conditions (e.g., about 28° C. to about 40° C.) over time according to an exemplary embodiment of the present disclosure. The x-axis represents elapsed time in seconds ranging from about 280 seconds to about 1,750 seconds, representing a duration of about 1,470 seconds or 24.5 minutes. The first y-axis (far left) represents altitude as determined by a global positioning system (GPS) in meters ranging from about 0 to about 1,500 meters. The second y-axis represents temperature in degrees Celsius ranging from about 10° C. to about 100° C.

In FIG. 2, the altitude is plotted with line 210, showing a climb from about 60 meters to about 1,290 meters. The temperature of the coolant ($T_{coolant}$) is plotted with line 220 increasing from about 58° C. to about 88° C. The ambient temperature ($T_{ambient}$) is plotted with line 230 decreasing from about 40° C. to about 28° C. A difference ($T_{coolant} - T_{ambient}$) between the temperature of the coolant ($T_{coolant}$) and the ambient temperature ($T_{ambient}$) is plotted with line 240 increasing from about 18° C. to about 60° C. Thus, as shown, as altitude increases, convection cooling capacity also increases.

Figure 3:
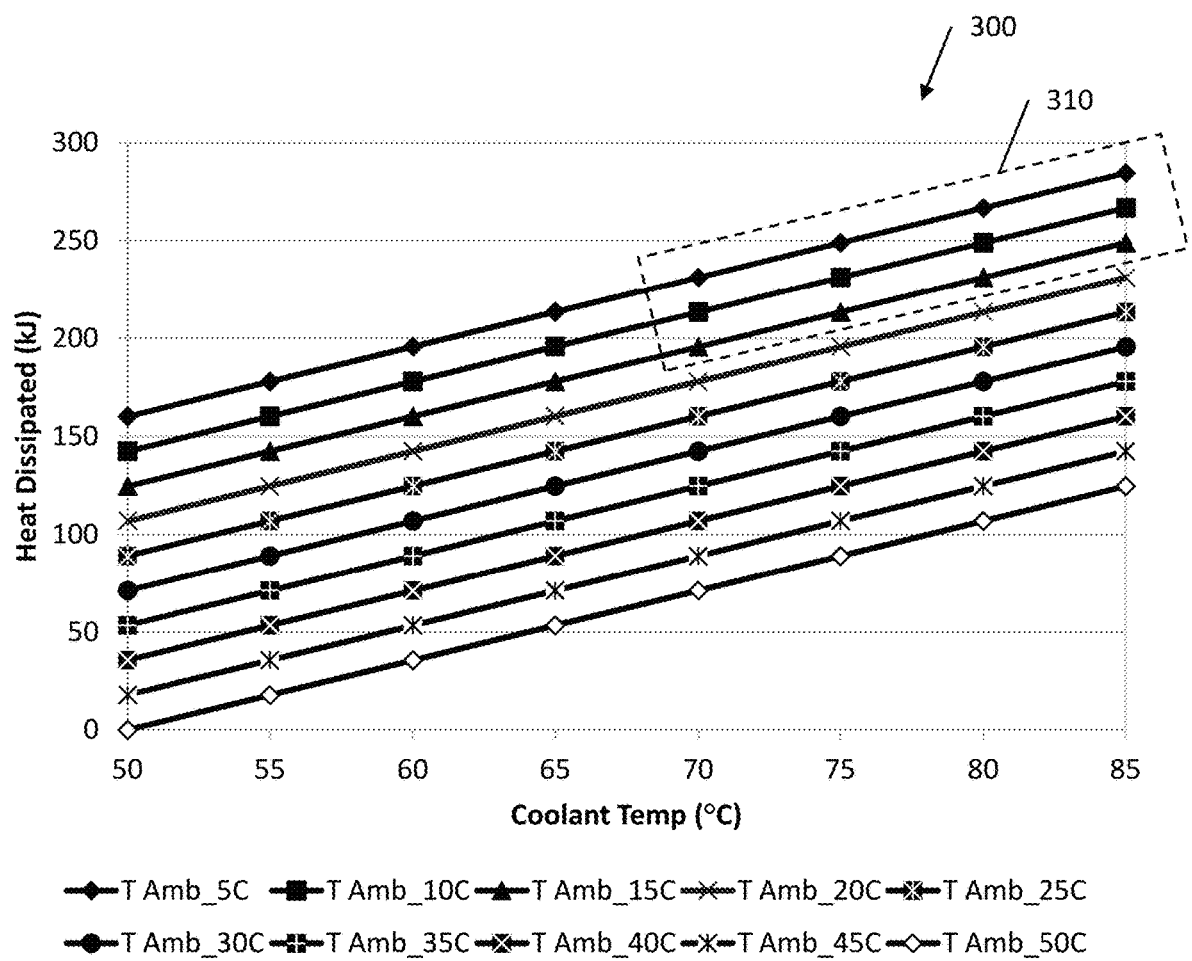
FIG. 3 is a chart showing a convection cooling model at various ambient temperatures according to an exemplary embodiment of the present disclosure.

FIG. 3 is a chart showing a convection cooling model at various ambient temperatures according to an exemplary embodiment of the present disclosure. In summary, the highest cooling by convection occurs at relatively low ambient temperatures and relatively high coolant temperatures. The x-axis in FIG. 3 represents the temperature of the coolant ($T_{coolant}$) in degrees Celsius ranging from about 50° C. to about 85° C., and the y-axis represents heat dissipated in kJ ranging from 0 kJ to about 300 kJ. For example, towards the top of FIG. 3, at an ambient temperature ($T_{ambient}$) of about 5° C., heat dissipated increases linearly from about 159 kJ at a coolant temperature ($T_{coolant}$) of about 50° C. to about 283 kJ at a coolant temperature ($T_{coolant}$) of about 85° C. Whereas, towards the bottom of FIG. 3, at an ambient temperature ($T_{ambient}$) of about 50° C., heat dissipated increases linearly from about 0 kJ at a coolant temperature ($T_{coolant}$) of about 50° C. to about 125 kJ at a coolant temperature ($T_{coolant}$) of about 85° C. Thus, within a region denoted with rectangle 310, the highest cooling by convection occurs at relatively low ambient temperatures (e.g., about 5° C. to about 15° C.) and relatively high coolant temperatures (e.g., about 70° C. to about 85° C.).

As such, cooling by convection is maximized at relatively low ambient temperatures and/or relatively high coolant temperatures. Conversely, cooling by convection is minimized at relatively high ambient temperatures and/or relatively low coolant temperatures. These effects are incorporated into the design of a fuel cell controller to optimize performance of the fuel cell system in varying conditions.

Beyond recognition of the effect of ambient temperature and coolant temperature, it is also important to compensate for the fact that a fuel cell generates heat as it produces power. Heat may be transferred into the FCEV's cooling system via a radiator and cooling lines. An instantaneous heat convection coefficient may be calculated using a heat transfer equation (below). From there, cooling capacity of the system may be calculated including how much heat has been cooled over time. A cooling ratio may be calculated as a ratio of accumulated cooled heat versus accumulated generated heat. For example, Equation (2) expresses heat of a fuel cell (FC) in kJ, as follows:

$$\text{FC Heat (kJ)} = [1.25 \cdot (\text{\# of Cells}) - \text{FC Voltage}] \cdot \text{FC Current} \cdot \text{time} \quad (2)$$

Additionally, heat of a fuel cell in kJ may also be expressed as the sum of cooling from convection and radiator fan cooling capacity, in accordance with Equation (3), as follows:

$$\text{FC Heat (kJ)} = C_{convection}(T_{coolant} - T_{ambient}) + 2.4(kW) \cdot \text{time}(s) \quad (3)$$

In Equation (3), the cooling from convection is $C_{convection}(T_{coolant} - T_{ambient})$ and the radiator fan cooling capacity is 2.4 (kW)·time (s). The convection coefficient $C_{convection}$ is unknown. The convection coefficient $C_{convection}$ may be solved by equating Equations (2) and (3), which results in Equation (4), as follows:

$$C_{convection} = \frac{\text{FC Heat(kJ)} - 2.4(kW) \cdot \text{time}(s)}{(T_{coolant} - T_{ambient})} [kJ/°C.] \quad (4)$$

Accumulated cooled heat and accumulated generated heat may be calculated using integrals as set forth in Equations (5) and (6), as follows:

$$\text{Accumulated Cooled Heat} = \int C_{convection}(T_{coolant} - T_{ambient}) dt [kJ] \quad (5)$$

$$\text{Accumulated Generated Heat} = \int \text{FC Heat } dt [kJ] \quad (6)$$

A cooling ratio is the ratio of accumulated cooled heat to accumulated generated heat, as set forth in Equation (7), as follows:

$$\text{Cooling Ratio} = \frac{\text{Accumulated Cooled Heat}}{\text{Accumulated Generated Heat}} \quad (7)$$

The cooling ratio may be used to increase power release. Specifically, a fuel cell may produce increased power by predicting the cooling capacity with the cooling ratio. Two methods may be used depending on whether the cooling ratio is sufficient to safely permit a relatively higher maximum allowable fuel cell current at any given coolant temperature. For example, using a fuel cell current limit map as an example, an absolute fuel cell current limit of, for example, about 335 A at 68° C., may be set. A maximum allowable fuel cell current may be determined with a power limit calibration table, such as Table 1, as follows:

TABLE 1

Power Limit Calibration Table

| Calibration Map | | Maximum Allowable Fuel Cell Current (A) |
|---|---|---|
| Coolant Temperature (° C.) | 68 | 335 |
| | 71 | 320 |
| | 74 | 305 |
| | 77 | 290 |
| | 80 | 275 |
| | 85 | 265 |

Under certain conditions, the maximum allowable fuel cell current may be higher than the maximum allowable fuel cell current set with the power limit calibration table of Table 1. Specifically, a maximum allowable fuel cell current may be determined according to a first condition according to Equation (8), as follows:

IF

[(Max Allowable Fuel Cell Current from Power Limit Calibration Table)−(Absolute Allowed Fuel Cell Current Limit·Cooling Ratio)]>0,

THEN

Final Max Allowable Fuel Cell Current=Power Limit Calibration Table Value (Table 1),

ELSE

[(Max Allowable Fuel Cell Current from Power Limit Calibration Table)−(Absolute Allowed Fuel Cell Current Limit·Cooling Ratio)]<0,

THEN

Final Max Allowable Fuel Cell Current=Absolute Allowed Fuel Cell Current Limit·Cooling Ratio (8)

Figure 4:
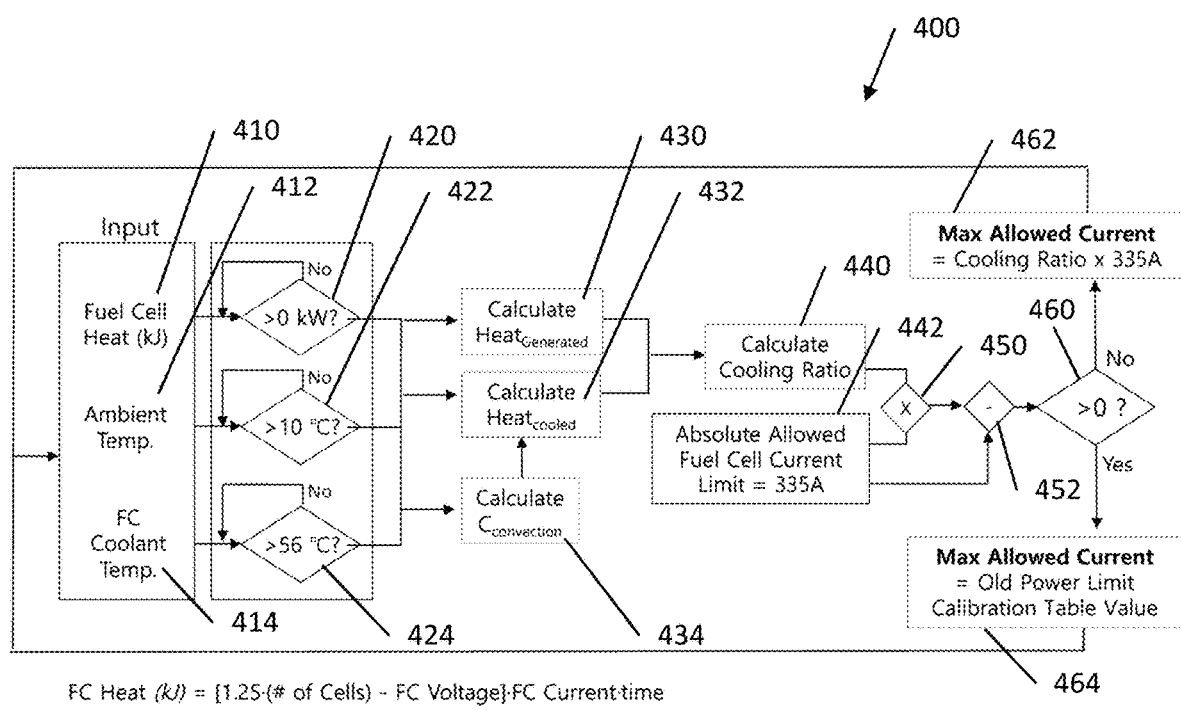
FIG. 4 is a logic diagram for a fuel cell electric vehicle control map according to an exemplary embodiment of the present disclosure.

The logic of the maximum allowable fuel cell current determination method may be expressed as shown, for example, in FIG. 4, which is a logic diagram or process diagram 400 for a fuel cell electric vehicle control map according to an exemplary embodiment of the present disclosure. Sensors in the engine and/or sensors in the vehicle may detect conditions within the vehicle and calculate various factors including fuel cell heat (kJ) 410, which may be calculated in accordance with Equation (2), ambient temperature (° C.) 412, and fuel cell coolant temperature (° C.) 414. A first series of calculations may be performed based on these factors.

For example, the fuel cell heat may be used to calculate fuel cell voltage, or fuel cell voltage may be directly measured with use of a voltage meter. If the fuel cell voltage is greater than a predetermined voltage, for example, 0 kW, i.e., step 420, then the process may advance to a second series of calculations. If the ambient temperature if greater than a first predetermined temperature, for example, 10° C., i.e., step 422, then the process may advance to the second series of calculations. If the fuel cell coolant temperature is greater than a second predetermined temperature, for example, 56° C., i.e., step 424, then the process may advance to the second series of calculations. If one or more of the conditions from steps 420, 422 and 424 are satisfied, then the second series of calculations may be performed. Accumulated generated heat may be calculated, for example, in accordance with Equation (6), i.e., step 430. Accumulated cooled heat may be calculated, for example, in accordance with Equation (5), i.e., step 432. The convection coefficient $C_{convection}$ may be calculated, for example, in accordance with Equation (4), i.e., step 434.

In some exemplary embodiments, step 434 may be performed before or after steps 430 and/or 432. In some exemplary embodiments, step 434 must be performed before step 432. A cooling ratio may be calculated based on the output of steps 430 and 432, for example, in accordance with Equation (7), i.e., step 440. An absolute fuel cell current limit of, for example, 335 A at 68° C., may be set, i.e., step 442. The cooling ratio of step 440 and the absolute fuel cell current limit may be factored and compared, for example, in accordance with Equation (8), i.e., steps 450, 452, 460, 462 and 464. Thus, the process 400 outputs a maximum allowed current for the FCEV. An engine of an FCEV may be operated with a controller in accordance with the output of the process 400.

Improved performance of a vehicle such as an FCEV equipped with the improved FCEV maximum power control map according to an exemplary embodiment of the present disclosure may be compared to the performance of a conventional vehicle. Exemplary results are provided in FIG. 5, which is a chart showing how the fuel cell electric vehicle control map according to an exemplary embodiment of the present disclosure results in an improved fuel cell current limit (which better reflects the actual cooling capacity of the system) over time relative to conventional control maps. The x-axis represents elapsed time in seconds ranging from about 0 seconds to about 1,200 seconds, representing a duration of about 1,200 seconds or 20 minutes. The y-axis represents fuel cell current in amperes (A) ranging from about 0 A to about 400 A.

Figure 5:
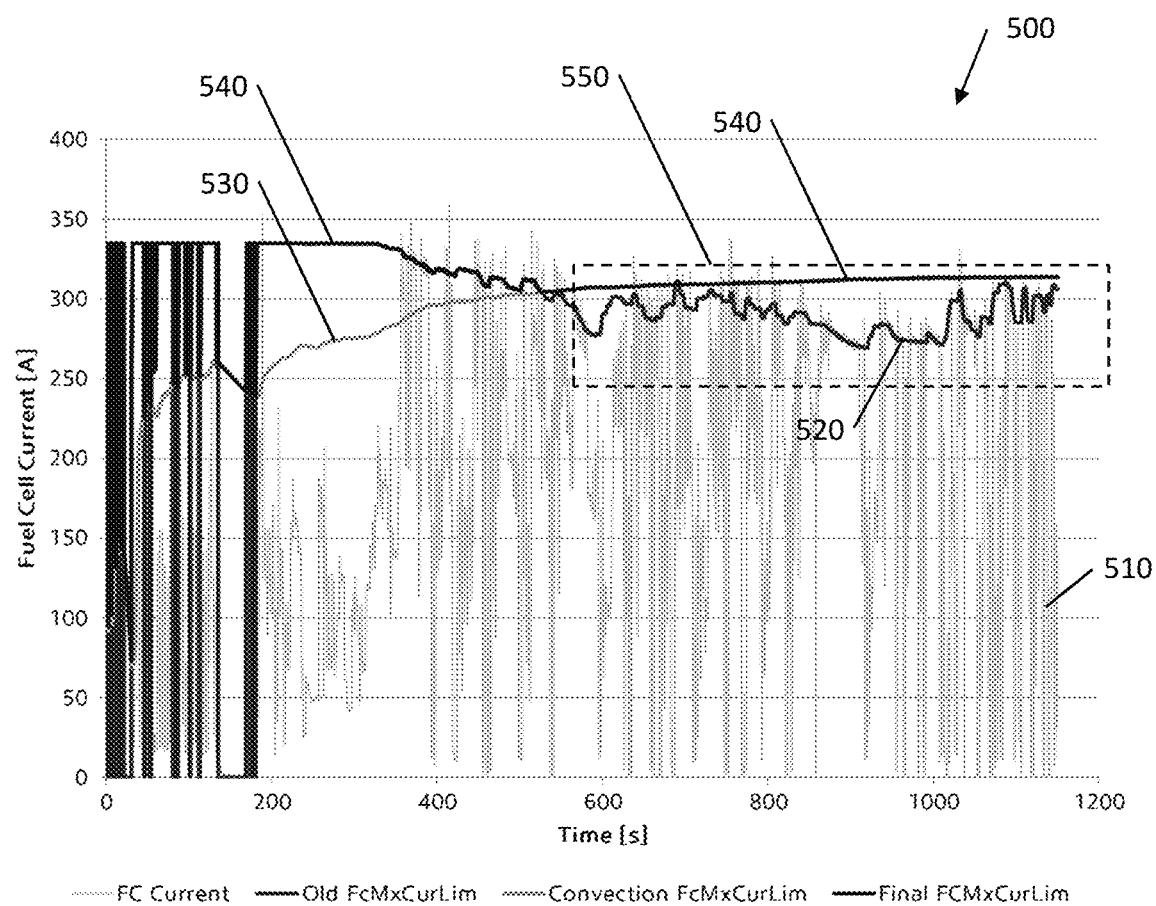
FIG. 5 is a chart showing how the fuel cell electric vehicle control map according to an exemplary embodiment of the present disclosure results in an improved fuel cell current limit (which better reflects the actual cooling capacity of the system) over time relative to conventional control maps.

In FIG. 5, the fuel cell current is plotted with line 510, the fuel cell maximum current limit according to a conventional method is plotted with line 520, the fuel cell maximum current limit based on convection is plotted with line 530, and the fuel cell maximum current limit according to the present improved method is plotted with line 540. In a region marked with rectangle 550, which represents relatively high altitude with a relatively high difference between the temperature of the coolant and the ambient temperature (corresponding with the right side of FIG. 2), the present improved method (line 540) permits a higher fuel cell current as compared to the conventional method (line 520) and thus better reflects the actual cooling capacity of the system.

Figure 6:
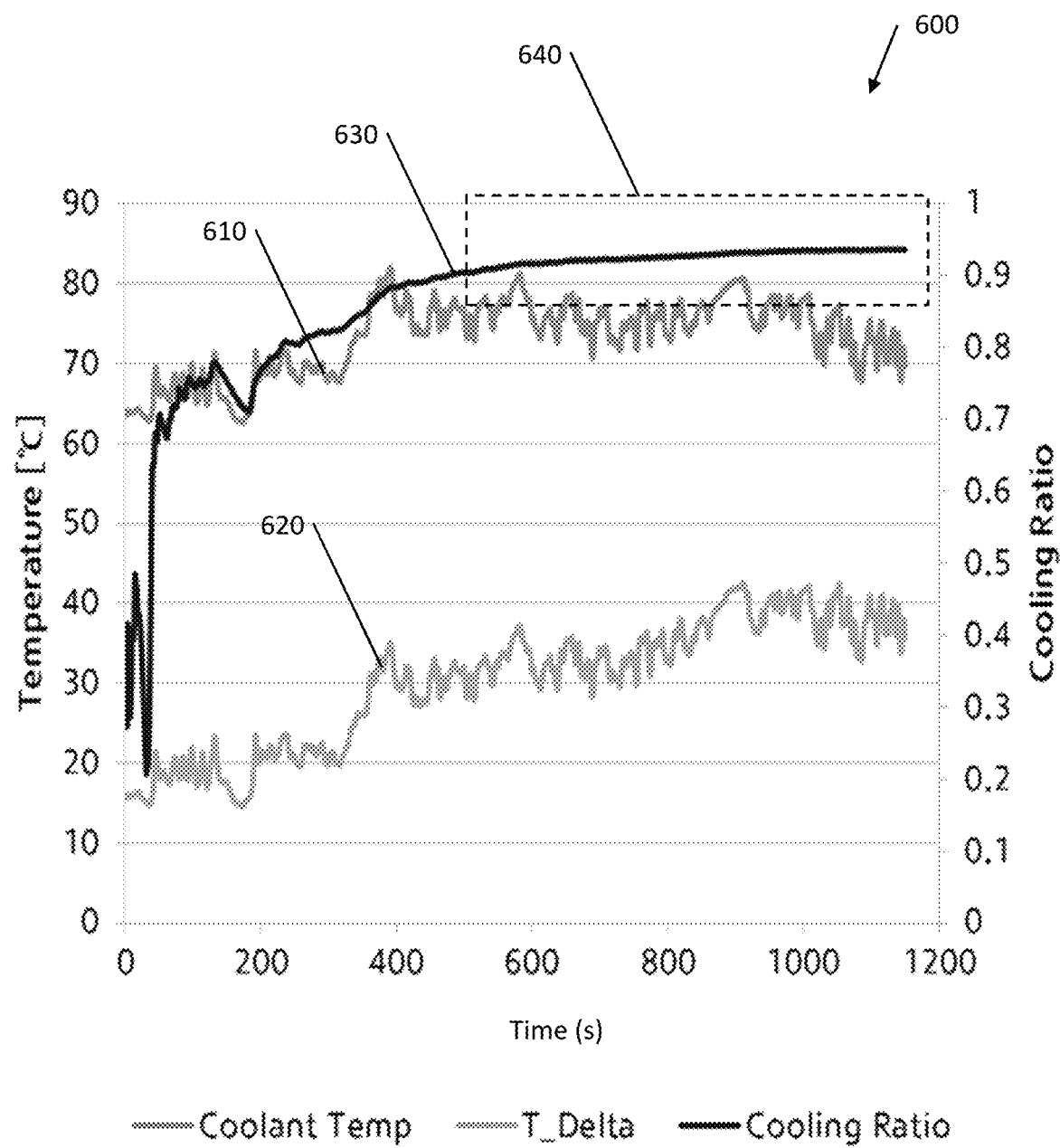
FIG. 6 is a chart showing temperatures and a cooling ratio over time according to an exemplary embodiment of the present disclosure.

Similarly, FIG. 6 is a chart showing temperatures and a cooling ratio over time according to an exemplary embodiment of the present disclosure. The x-axis represents elapsed time in seconds ranging from about 0 seconds to about 1,200 seconds, representing a duration of about 1,200 seconds or 20 minutes. The first y-axis on the left side represents temperature for lines 610 and 620 ranging from about 0° C. to about 90° C. The second y-axis on the right side represents the cooling ratio for line 630 ranging from about 0 to about 1.

In FIG. 6, the temperature of the coolant is plotted with line 610 and increases from about 64° C. to about 70° C. with a few intermediate peaks above 80° C. at about 400, 600 and 900 seconds. The difference between the temperature of the coolant and ambient temperature is plotted with line 620 and increases from about 16° C. to about 35° C. with a few intermediate peaks above 40° C. between 875 and 1,100 seconds. The cooling ratio is plotted with line 630 and ranges from about 0.20 to about 0.95. The highest cooling ratios, i.e., above 0.90, were observed in a region marked with rectangle 640 beginning at about 500 seconds and steadily increasing and then leveling off at a cooling ratio of about 0.95 to the end of the data set at about 1,150 seconds. In other words, at a relatively high altitude with a relatively high difference between the temperature of the coolant and the ambient temperature, due to a relatively high cooling ratio, the present improved method permits a higher fuel cell current as compared to the conventional method and thus better reflects the actual cooling capacity of the system.

Figure 7:
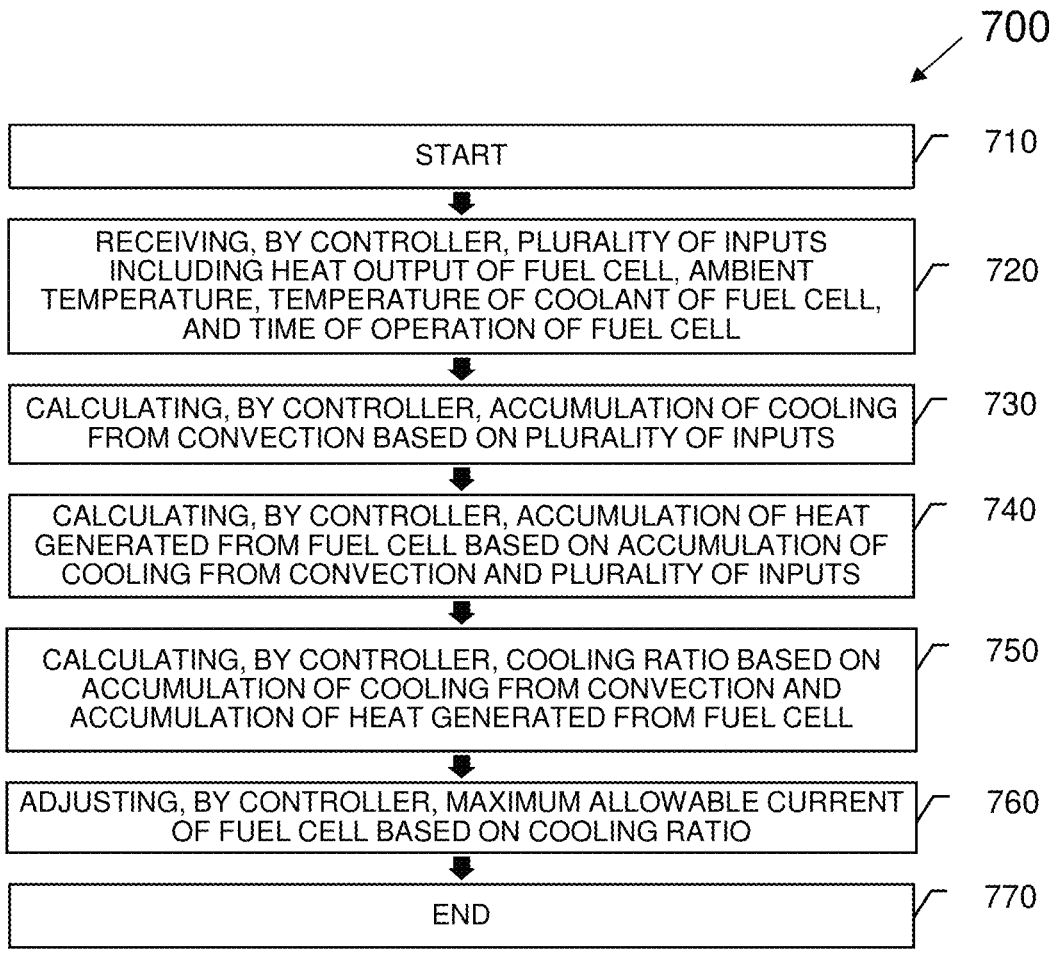
FIG. 7 is a process diagram illustrating a method of controlling power of a fuel cell according to an exemplary embodiment of the present disclosure.

The FCEV maximum power control map may be implemented with an in-vehicle computer or controller configured with specific instructions to execute the control process. One or more steps of the methods described herein may be executed by the controller. FIG. 7 is a process diagram illustrating a method of controlling power of a fuel cell according to an exemplary embodiment of the present disclosure. The process 700 may include a start instruction (step 710). The process 700 may include receiving, by a controller, a plurality of inputs including a heat output of the fuel cell, an ambient temperature, a temperature of a coolant of the fuel cell, and a time of operation of the fuel cell (step 720). The process 700 may include calculating, by the controller, an accumulation of cooling from convection based on the plurality of inputs (step 730).

Additionally, the process 700 may include calculating, by the controller, an accumulation of heat generated from the fuel cell based on the accumulation of cooling from convection and the plurality of inputs (step 740). Further, the process 700 may include calculating, by the controller, a cooling ratio based on the accumulation of cooling from convection and the accumulation of heat generated from the fuel cell (step 750). Still further, the process 700 may include adjusting, by the controller, a maximum allowable current of the fuel cell based on the cooling ratio (step 760). Even further, the process 700 may include an end instruction (step 770).

The foregoing description has been directed to exemplary embodiments of the present disclosure. It will be apparent, however, that other variations and modifications may be made to the described exemplary embodiments, with the attainment of some or all of their advantages. Accordingly, this description is to be taken only by way of example and not to otherwise limit the scope of the exemplary embodiments herein. Therefore, it is the object of the appended claims to cover all such variations and modifications as come within the true spirit and scope of the exemplary embodiments herein.

What is claimed is:

1. A method of controlling power of a fuel cell, comprising:
   receiving, by a controller, a plurality of inputs including a heat output of the fuel cell, an ambient temperature, a temperature of a coolant of the fuel cell, and a time of operation of the fuel cell;
   calculating, by the controller, an accumulation of cooling from convection based on the plurality of inputs;
   calculating, by the controller, an accumulation of heat generated from the fuel cell based on the accumulation of cooling from convection and the plurality of inputs;
   calculating, by the controller, a cooling ratio based on the accumulation of cooling from convection and the accumulation of heat generated from the fuel cell; and
   adjusting, by the controller, a maximum allowable current of the fuel cell based on the cooling ratio,
   wherein the maximum allowable current of the fuel cell is determined by:
   calculating, by the controller, a difference between an absolute allowed fuel cell current limit and a product of the absolute allowed fuel cell current limit and the cooling ratio; and
   comparing, by the controller, the difference with a predetermined threshold.

2. The method of claim 1, further comprising:
   determining, by the controller that the difference is greater than the predetermined threshold; and
   setting, by the controller, the maximum allowable current of the fuel cell based on a power limit calibration table value.

3. The method of claim 1, further comprising:
   determining, by the controller, that the difference is less than the predetermined threshold; and
   setting, by the controller, the maximum allowable current of the fuel cell based on the product of the absolute allowed fuel cell current limit and the cooling ratio.

4. The method of claim 1, further comprising: calculating, by the controller, a convection coefficient based on the heat output of the fuel cell, a radiator fan cooling capacity based on the time of operation of the fuel cell, and a difference between the temperature of the coolant of the fuel cell and the ambient temperature.

5. The method of claim 4, further comprising: calculating, by the controller, an integration of a product of the convection coefficient and the difference between the temperature of the coolant of the fuel cell and the ambient temperature over the time of operation of the fuel cell.

6. The method of claim 1, further comprising: calculating, by the controller, an integration of the heat output of the fuel cell over the time of operation of the fuel cell.

7. The method of claim 1, further comprising: operating, by the controller, a vehicle based on the adjusting of the maximum allowable current of the fuel cell based on the cooling ratio.

8. A method of controlling power of a fuel cell, comprising: receiving, by a controller, a plurality of inputs including a heat output of the fuel cell, an ambient temperature, a temperature of a coolant of the fuel cell, and a time of operation of the fuel cell; calculating, by the controller, an accumulation of cooling from convection based on the plurality of inputs; calculating, by the controller, an accumulation of heat generated from the fuel cell based on the accumulation of cooling from convection and the plurality of inputs; calculating, by the controller, a cooling ratio based on the accumulation of cooling from convection and the accumulation of heat generated from the fuel cell; and adjusting, by the controller, a maximum allowable current of the fuel cell based on the cooling ratio, the method further comprising: determining, by a processor, that the heat output of the fuel cell is greater than a first predetermined threshold; determining, by the processor, that the ambient temperature is greater than a second predetermined threshold; and determining, by the processor, that the temperature of the coolant of the fuel cell is greater than a third predetermined threshold.

9. The method of claim 8, wherein the first predetermined threshold is about 0 kW, the second predetermined threshold is about 10° C., and the third predetermined threshold is about 56° C.

* * * * *